United States Patent
Michel et al.

(10) Patent No.: US 7,360,141 B2
(45) Date of Patent: Apr. 15, 2008

(54) METHOD AND DEVICE FOR TRANSMITTING DATA ACCORDING TO A HYBRID ARQ METHOD

(75) Inventors: Jürgen Michel, München (DE); Bernhard Raaf, München (DE)

(73) Assignee: Siemens Aktiengesellschaft, Munich (DE)

( * ) Notice: Subject to any disclaimer, the term of this patent is extended or adjusted under 35 U.S.C. 154(b) by 700 days.

(21) Appl. No.: 10/468,644

(22) PCT Filed: Feb. 6, 2002

(86) PCT No.: PCT/DE02/00431

§ 371 (c)(1),
(2), (4) Date: Aug. 19, 2003

(87) PCT Pub. No.: WO02/067490

PCT Pub. Date: Aug. 29, 2002

(65) Prior Publication Data
US 2004/0085986 A1    May 6, 2004

(51) Int. Cl.
*H03M 13/00* (2006.01)

(52) U.S. Cl. ..................................... 714/751

(58) Field of Classification Search ............. 714/751
See application file for complete search history.

(56) References Cited

U.S. PATENT DOCUMENTS

| | | | |
|---|---|---|---|
| 6,023,783 A * | 2/2000 | Divsalar et al. | 714/792 |
| 6,308,294 B1 * | 10/2001 | Ghosh et al. | 714/751 |
| 7,072,307 B2 * | 7/2006 | Tong et al. | 370/253 |

OTHER PUBLICATIONS

XP-002197886—Universal Mobile Telecommunications System (UMTS) Multiplexing and channel coding (FDD) (3GPP TS 25.212 version 3.5.0 Release 1999).
XP-000954425 "On the Performance of Hybrid FEC/ARQ Systems Using Rate Compatible Punctured Turbo (RCPT) Codes" Rowitch et al, pp. 948-959.
Electronics Letters Nov. 26, 1998, vol. 34, No. 24 "Adaptive hybrid ARQ scheme using concatenated FEC for ATM over wireless lines" Sim et al.
XP-002197887 Universal Mobile Telecommunications System (UMTS); RLC protocol specification (3GPP TS 25.322 version 3.5.0 Release 1999).

* cited by examiner

*Primary Examiner*—Joseph D. Torres
(74) *Attorney, Agent, or Firm*—Bell, Boyd & Lloyd LLP

(57) ABSTRACT

To achieve a greater flexibility when transmitting data according to a hybrid ARQ method, preferably when used in a mobile radio system, a channel-coded bit stream is divided into at lest one first bit stream and one second bit stream whereby these parallel bit streams are each subjected to a separate bit rate matching, and the resulting bits of the individual bit streams are subsequently combined with one another once again in order to transmit in a data packet or in a repeat data packet that is requested on the receiver side.

18 Claims, 2 Drawing Sheets

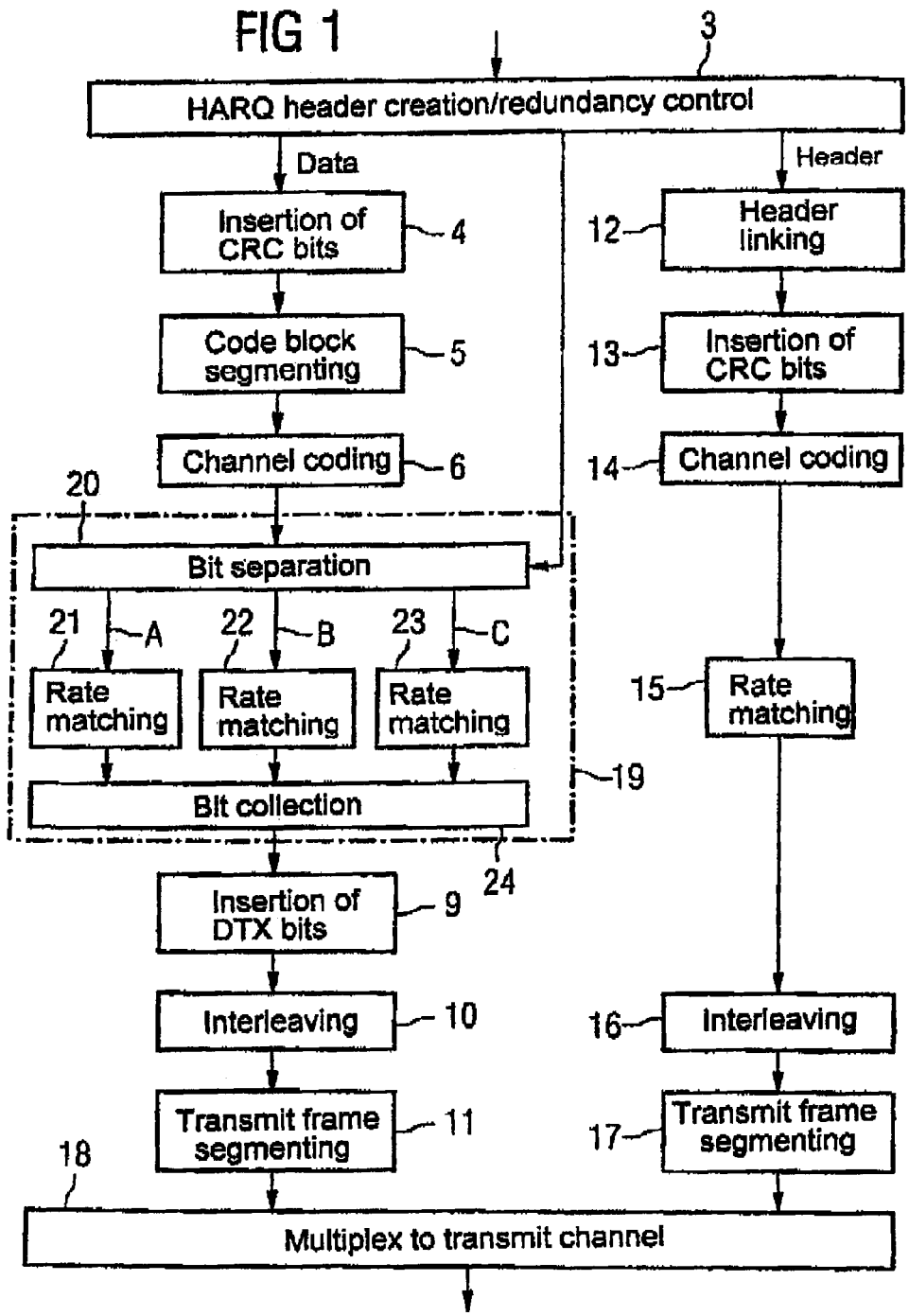

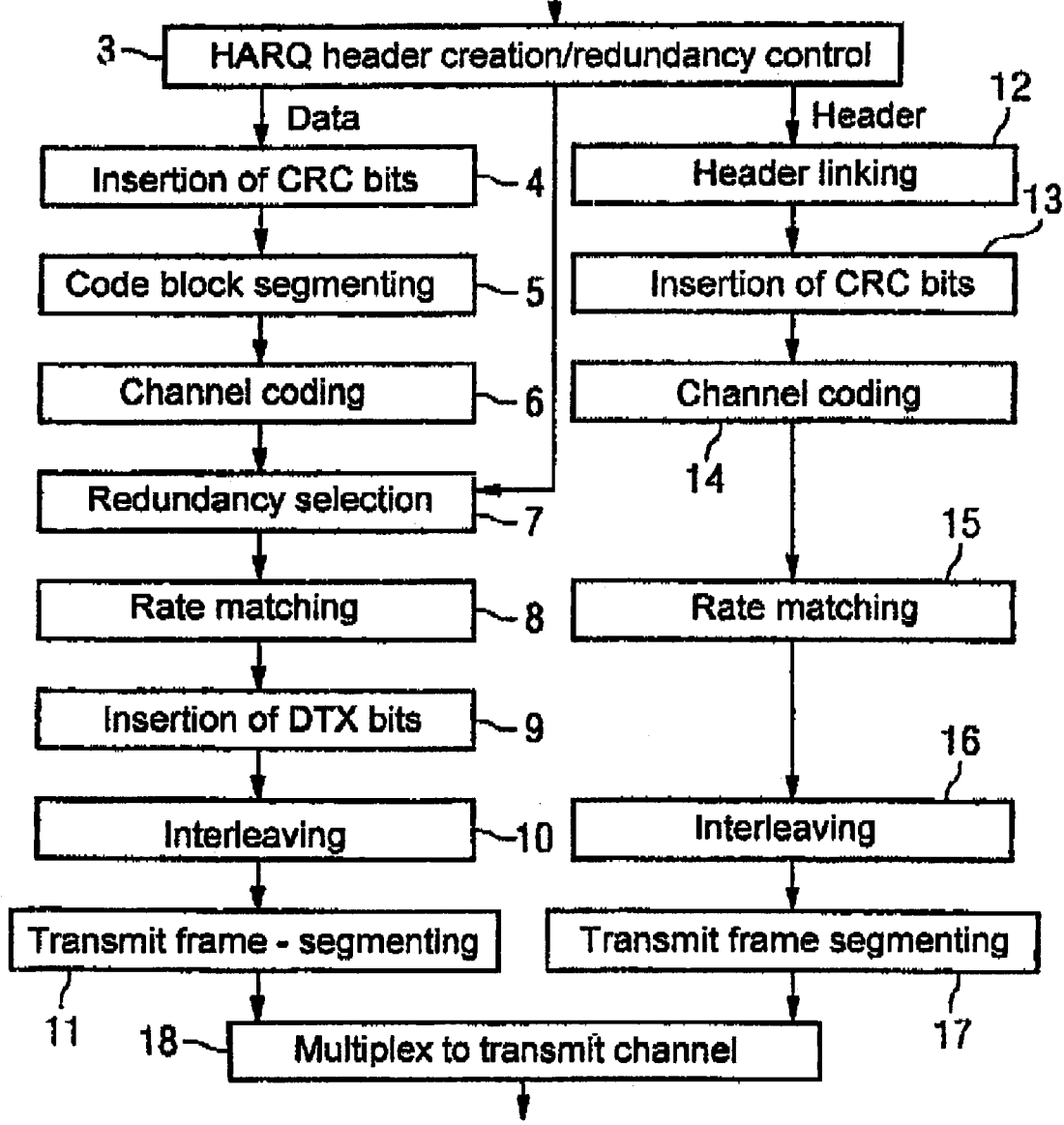

METHOD AND DEVICE FOR TRANSMITTING DATA ACCORDING TO A HYBRID ARQ METHOD

BACKGROUND OF THE INVENTION

The present invention relates to a method and a correspondingly designed device for transmitting data according to a hybrid ARQ method in a communication system; in particular, a mobile radio system.

The use of so-called packet access methods or packet-oriented data connections is often recommended in connection with mobile radio systems, since the message types produced often have a very high burst factor with the result that only short periods of activity exist, interrupted by long rest phases. Packet-oriented data connections may, in this case, considerably increase efficiency compared to other data transmission methods in which a continuous data stream is present, since, in data transmission methods with a continuous data stream, once a resource has been allocated, such as a carrier frequency or a time slot, it remains allocated during the entire communication relationship. That is, a resource remains occupied even if there are momentarily no data transmissions taking place, wherein the resource is not available for other network users. The result is that the narrow frequency range available for mobile radio systems is not used to best effect.

Future mobile radio systems, such as those that comply with the mobile radio standard UMTS (Universal Mobile Telecommunications System), will offer a multitude of different services whereby multimedia applications will become increasingly prevalent alongside pure voice transmission. The diversity of services associated with this, with different transmission rates, requires a highly flexible access protocol on the air interface of future mobile radio systems. Packet-oriented data transmission systems have proved to be highly suitable in this context.

In connection with UMTS mobile radio systems, a so-called ARQ (Automatic Repeat Request) method has been proposed in packet-oriented data connections. In this method, the data packets transferred from a transmitter to a receiver are checked for quality at the receiving end following decoding. If a data packet is errored on receipt, the receiver requests retransmission of the data packet by the transmitter; i.e., a repeat data packet which is identical or partially identical to the one previously sent and which was errored on receipt is sent from the transmitter to the receiver, (the terms full or partial repeat are used to indicate whether the quantity of data contained in the repeat data packet is less than or equal to that of the original data packet). With regard to the ARQ method proposed for the UMTS mobile radio standard, the intention is for both data and so-called header information to be transmitted in a data packet, whereby the header information also contains information for error checking, such as CRC (Cyclic Redundancy Check) bits, and also can be coded for error correction (known as FEC, Forward Error Correction).

In accordance with the current proposals for the UMTS specification, it is planned to introduce a so-called hybrid ARQ method which is also known as the Incremental Redundancy ARQ method. The main difference compared to the conventional ARQ method described above is that a coding process is carried out in the receiver using several data packets with the same information source but different channel coding. In other words, several data packets with the same information source are decoded and evaluated until an originally transmitted data packet is deemed to have been decoded as error-free in the receiver. In contrast to the previously described ARQ method, in the hybrid ARQ method the repeat data packets (which are also called "retransmission") are not normally identical to the data packet originally transmitted.

FIG. 3 shows the signal processing for the hybrid ARQ method under discussion in accordance with the current status of UMTS standardization.

As shown in FIG. 3, the generation of the transmission signal is subdivided into the processing of the actual data and the processing of the header information. On the header side, the header information created by a function block 3 is supplied to a function block 12, which ensures that all headers of all data packets that are to be transmitted in the same radio packet are linked together into a single header (header concatenation). A function block 13 inserts CRC bits for error detection into the resulting header information. The resulting bit stream is then subjected to channel coding by a function block 14 and rate matching by a function block 15. An interleaver 16 causes the symbols and/or bits supplied to it to be arranged in a particular way and time-interleaved. The data blocks produced by the interleaver 16 are allocated by a function block 17 to the individual transmit or radio frames (known as radio frame segmentation).

A function block 4 is also provided on the data side for the insertion of CRC bits. A function block 5 is used for splitting the data supplied to a channel coder 6 such that a coding process limited to a specific number of bits can always be carried out by the channel coder 6.

Because of the channel coding carried out by the channel coder 6, the actual data to be transmitted has redundant information inserted in it with the result that several consecutively transmitted data packets have bits with the same information origin. In the hybrid ARQ method (as per so-called Types II and III), if a data packet is incorrectly received or decoded by the receiver, the transmitter does not send the same packet again to the receiver but instead transfers a data packet which has at least some bits with the same information source as the bits contained in the data packet originally transferred. The receiver, by evaluating together all data packets containing bits with the same information source, can retrieve the originally transmitted information with better quality.

In order to implement the hybrid ARQ method described above, it is necessary, if so requested by the receiver, for the data transmission signals with incremental redundancy which are received in the originally transmitted data packet and the corresponding repeat data packets to be generated from the same information source (so-called redundancy selection). For this purpose, after the channel coder 6 a corresponding function block 7 is provided, which is controlled by the function block 3 as a control entity and carries out a corresponding bit selection process after the channel coding. In this way, the bits to be transmitted in the first packet and in repeat data packets are selected by the function block 7 according to the control exercised by the function block 3.

The data produced by function block 7 is supplied to a function block 8, which adjusts the bit rate of the data stream by masking or omitting individual bits (known as puncturing) or repeating individual bits. So-called DTX (Discontinuous Transmission) bits can be inserted into the data stream by a subsequent function block 9. Also provided on the data side are function blocks 10 and 11, which perform the same functions as do function blocks 16 and 17 on the header side.

Finally, the bits produced on the data and header side are mapped or multiplexed by a function block 18 on whatever physical transfer or transmission channel is available at the time.

To ensure that the hybrid ARQ method or incremental redundancy ARQ method operates with maximum efficiency, the FEC coding of the various data repeat packets should be selected, if possible, such that the data packets typically have very little concurrence between them. This is particularly problematic in the case of UMTS because of the high flexibility of the channel coding and data matching carried out with regard to the individual transmission channels; in particular, since the channel coding cannot be optimized solely in terms of its efficiency. Other factors are also involved in this; for example, the memory requirement and the complexity of the algorithms executed, an essential role since this particularly affects the algorithms executed on the part of the mobile station.

In general, the problem with the hybrid ARQ method explained using FIG. 3 is that of how best to code an originally transmitted data packet, and possibly one or more subsequently transmitted repeat data packets, in order to achieve maximum benefit.

The present invention is, therefore, directed toward a method and a correspondingly designed device for transmitting data according to a hybrid ARQ method, that enables the principle of a hybrid ARQ method to be implemented with increased flexibility and better use of the potential coding gain without significantly increasing the complexity and the memory requirement.

SUMMARY OF THE INVENTION

The basic idea behind the present invention is to combine the function blocks 7 and 8 for redundancy selection and rate matching shown in FIG. 3, so that a more efficient coding process can take place. Thus, the function blocks 7 and 8 of the hybrid ARQ structure shown in FIG. 3 are replaced, in particular, by a structure which carries out a bit separation process in order to generate several (differently coded) parallel bit streams with subsequent bit collection. The different bit streams are each subjected to rate matching independently of one another. In this way, greater flexibility is achieved with the coding. For each data packet or repeat data packet to be transmitted, the different parallel bit streams can be combined with one another, preferably in proportion. This can be implemented particularly effectively in the case of bit repetition.

An advantage of the proposed method and/or the corresponding device according to the present invention is greater flexibility and better use of the potential coding gain, while also enabling a less repetition-based rate-matching to be achieved without any significant increase in complexity and memory requirement (the latter would be required, in particular, for the interleaving).

Other embodiments of the present invention relate, in particular, to the method of bit separation and bit collection executed according to the teachings of the present invention and the choice of rate matching for the various different bit streams which result from the bit separation process.

Additional features and advantages of the present invention are described in, and will be apparent from, the following Detailed Description of the Invention and the Figures.

BRIEF DESCRIPTION OF THE FIGURES

FIG. 1 is a diagram for clarifying signal processing; in particular according to a packet-oriented hybrid ARQ method of the present invention.

FIG. 2 is a diagram for clarifying the communication in a mobile radio system.

FIG. 3 is a diagram for clarifying the signal processing according to a conventional packet-oriented hybrid ARQ method.

DETAILED DESCRIPTION OF THE INVENTION

As already explained, the following is based on the idea that packet-oriented data transmission in a mobile radio system, as shown schematically in FIG. 2 by way of example, is to be implemented with the help of the present invention. Thus, FIG. 2 shows by way of example the communication between a base station 1 and a mobile station 2 of a mobile radio system; for example, a UMTS mobile ratio system. The transmission of information from the base station 1 to the mobile station 2 takes place via the so-called downlink channel DL, while the transmission of information from the mobile station 2 to the base station 1 takes place via the so-called uplink channel UL. The present invention is explained below using as an example a packet-oriented data transmission from the base station 1 to the mobile station 2 (i.e., a packet-oriented data transmission via the downlink channel). The present invention also can, however, be used similarly on data transmission via the uplink channel. The present invention is further explained below analogously to FIG. 3 on the basis of the signal processing measures to be executed in the transmitter concerned, whereby it is important to note that a corresponding signal processing operation in the reverse sequence is required in the relevant receiver for evaluation of the data processed in this way at the transmitter end, such that the present invention affects not only the transmitter end but also the receiver end.

FIG. 1 shows the signal processing of the data and header information to be transferred in data packets following a hybrid ARQ method according to the present invention. The present invention mainly affects the processing of the data part, so that the function blocks 12-17 shown in FIG. 1 that affect the header part correspond to the function blocks 12-17 shown in FIG. 3. Likewise, the function blocks 3-6, 9-11, and 18 shown in FIG. 1 correspond to the function blocks with the same numbers in FIG. 3, wherein the above explanations concerning FIG. 3 also can be used with reference to the purpose and function of these function blocks.

As can be seen from FIG. 1, the function blocks 7 and 8 as shown in FIG. 3 have been replaced by a new function section 19. This function section 19 includes a function block 20—which, dependent upon control exercised by the function block—3, separates the coded bits produced by the upstream channel coder 6 into at least two parallel bit streams, which are each subjected to rate matching separately; i.e., independently of one another. In this regard, FIG. 1 shows three bit streams, each of which has one function block 21-23 provided for rate matching; i.e., for puncturing or repetition of individual bits. This results in several differently coded parallel bit streams, which are supplied to a further function block 24. This further function block 24 has the task of collecting the individual bits from the parallel bit streams in the same sequence that was used by function block 20 for the bit separation process; i.e., for the separation into the individual parallel bit streams. This is to ensure that the sequence of bits remaining after rate matching remains unchanged overall.

If one of these parallel bit streams is selected exclusively for each data packet, the signal processing method as per FIG. 1 can be transferred to the signal processing method as per FIG. 3. However, it can be seen that the signal processing method shown in FIG. 1 enables greater flexibility to be achieved in coding. In particular, it is possible for the different parallel bit streams to be combined with one another proportionally for each data packet, this being particularly useful in the case of bit repetition. Thus, for example, instead of applying a purely repetition-based coding to a single bit stream, as would be the case in the repetition-based coding shown in FIG. 3, in the signal processing method shown in FIG. 1 the bit stream A can be transferred unchanged (i.e., without carrying out a rate matching process), while at the same time the bit stream B shown in FIG. 1 can be used with appropriate rate matching to pad the remaining transmit signals. In particular, the separation of the bits from the channel-coded bit stream into the individual bit streams A-C may be selected such that only bits from the bit streams 1 to N are used for a data packet or repeat data packet. This is not possible according to the prior art shown in FIG. 3 and can only be implemented by the principle proposed in accordance with the present invention, as shown in FIG. 1, by way of example. This variant has the advantage that only memory for N bit blocks needs to be reserved in the receiver for receiving the repeat data packet no. N, since it is already known that the received data only comes from these N bit blocks. More generally, a scheme also can be devised whereby the number of bit blocks used for the repeat data packets 1 to N increases monotonically or even strictly monotonically with N.

Preferred embodiments for the bit separation and bit collection processes carried out by function blocks 20 and 24 respectively and for the rate matching processes carried out by function blocks 21 to 23 are to be explained below.

In view of the choice of parallel rate matching samples which are implemented by function blocks 21 and 22—and, if necessary, 23, provision can be made for these to be selected such that a function is executed by the entire function section 19, which is equivalent to the function exercised by function blocks 7 and 8 shown in FIG. 3 according to the current state of the specification.

During repetition, the data packets likewise can be padded with data from more than two parallel bit streams A-C, such that the bits from one bit stream or branch are transferred in their (i.e., unchanged), while the bits from the other bit streams or branches are used to pad the remaining data. According to a further embodiment the rate matching sample also may be selected such that the data packets used in repetition are padded with data from exactly two parallel bit streams, whereby one bit stream is transferred in its entirety (i.e., unchanged), while the other bit stream is used to pad the remaining data.

The functioning of function blocks 20 and 24 can be selected such that an original data packet to be transmitted always contains data from bit stream A—or, if the data from bit stream A is already being transferred in its—entirety, data from bit streams A and B. For the first repeat data packet, then, data from bit stream B is used in—preference or, if the data from bit stream B is already being transferred in its—entirety, data from bit streams B and A. For the second repeat data packet it is particularly beneficial to use data from bit stream C—or, if the data from bit stream C is already being transferred in its—entirety, data from bit streams C and B.

In general, the aim is to use the memory in the mobile station 2 as efficiently as possible by combinations, and thus to avoid spreading data in the data packets too greatly with regard to its origin. In addition, it also should be possible to make use of a maximum gain in terms of coding.

An optimum selection in terms of memory requirement for mobile station 2 is explained below, whereby the embodiment explained subsequently represents a compromise between the memory requirement and the efficiency to be expected. In accordance with this embodiment, bits to be repeated are selected only from such branches or bit streams whose data already is being transferred according to the prior art as per FIG. 3, whereby an increased memory requirement, particularly in the receiver, is avoided. According to this embodiment, the original data packet contains only data from bit stream A. The first repeat data packet contains data from bit stream B—or, if the data from bit stream B is already being transferred in its—entirety, data from bit streams B and A. To this extent, this embodiment is the same as the one described above. However, unlike in the embodiment described above, the second repeat data packet contains data from bit stream C—or, if the data from bit stream C already is being transferred in its—entirety, data from bit stream C and from bit stream B and/or bit stream A.

It is generally advisable, after exactly one repetition has been requested, to transfer bit streams A and B in roughly equal bit quantities. After exactly two repetitions have been requested, bit streams A, B and C should be transferred in roughly equal bit quantities.

Of course, all the embodiments described in this patent application may, in general, be applied to more than two repetitions.

According to a further embodiments of the present invention, a large proportion of the data can be punctured following the coding process by the channel coder 6 of those branches and/or bit streams A-C, which are not primarily for transmission, since only a small proportion of the bits to be transferred (typically 10%, for example) are selected anyway from these bit streams by the subsequent rate matching. Therefore it does not matter if 90% of the bits from these branches and/or bit streams are deleted immediately. This measure allows for a correspondingly smaller memory space being required in the interim function blocks, so that this embodiment primarily aims to reduce the memory requirement further.

The embodiment described below is equivalent to the last variant mentioned above. Instead of selecting a specific bit stream (e.g. bit stream B) with subsequent puncturing of 90%, two bit streams also may be introduced instead of this bit stream (e.g., bit stream B' and bit stream B"), whereby one bit stream (B') contains 10% of the bits of the original bit stream (B).

Although the present invention has been described with reference to specific embodiments, those of skill in the art will recognize that changes may be made thereto without departing from the spirit and scope of the present invention as set forth in the hereafter appended claims.

The invention claimed is:

1. A method for hybrid Automatic Repeat Request (ARQ) data transmission, the method comprising the steps of:
   transmitting a data packet;
   transmitting a repeat data packet in response to an automatic repeat request, wherein the data packet and repeat data packet are at least partially identical, and each form part of a respective channel-coded bit stream;

performing a bit selection process to select bits for further transmission in at least one of the data packet and the repeat data packet;

subjecting bits for further transmission to a bit rate matching process, wherein the bit rate matching process comprises the steps of:

separating bits from each respective channel-coded bit stream into at least a first bit stream and a second parallel bit stream, and determining if any bit streams are selected for exclusive further transmission in relation to the data packet and the repeat data packet;

performing a separate bit rate matching process on each of the individual bit streams, wherein bits of the first bit stream are used unchanged for a data packet for further transmission, and bits of the second bit stream are used for padding the data packet for further transmission, if the first bit stream is selected for exclusive further transmission, and bits of the second bit stream are used unchanged for a repeat data packet and bits of the first bit stream are used for padding the repeat data packet, if the second bit stream is selected for exclusive further transmission.

2. The method for hybrid Automatic Repeat Request (ARQ) data transmission as claimed in claim 1, wherein bits that have been individually channel-coded by the separate bit rate matching process are only repeated if all bits from the respective channel-coded bit stream are selected for further transmission during bit rate matching.

3. The method for hybrid Automatic Repeat Request (ARQ) data transmission as claimed in claim 1, wherein bits of the first and second bit stream are used for padding if the determining step indicates that none of the bit streams are selected for exclusive transmission.

4. The method for hybrid Automatic Repeat Request (ARQ) data transmission as claimed in claim 1, wherein the separation of the bits of the channel-coded bit stream is selected such that the data packet contains bits from the first bit stream and bits from the second bit stream if the determining step indicates that none of the bit streams are selected for exclusive transmission.

5. The method for hybrid Automatic Repeat Request (ARQ) data transmission as claimed in claim 1, wherein the separation of the bits of the channel-coded bit stream is selected such that the repeat data packet contains bits from the second bit stream and bits from the first bit stream if the determining step indicates that none of the bit streams are selected for exclusive transmission.

6. The method for hybrid Automatic Repeat Request (ARQ) data transmission as claimed in claim 1, further comprising the steps of:

transmitting a further repeat packet in response to the automatic repeat request, wherein the further repeat packet is at least partially identical to the data packet and repeat packet, and wherein the further repeat packet is transmitted after the data packet and repeat packet;

performing a bit selection process to select bits for further transmission in the further repeat data packet;

forming a third parallel bit stream during the step of separating the bits from the channel-coded bit stream; and subjecting the third bit streams to a separate bit rate matching process together with the first and second bit streams during the bit-rate matching step.

7. The method for hybrid Automatic Repeat Request (ARQ) data transmission as claimed in claim 6, wherein the further repeat data packet contains bits from the third bit stream.

8. The method for hybrid Automatic Repeat Request (ARQ) data transmission as claimed in claim 6, wherein the further repeat data packet contains bits from the third bit stream and bits from the second bit stream.

9. The method for hybrid Automatic Repeat Request (ARQ) data transmission as claimed in claim 6, wherein the further repeat data packet contains bits from the third bit stream and bits from at least one of the first bit stream and the second bit stream.

10. The method for hybrid Automatic Repeat Request (ARQ) data transmission as claimed in claim 6, further comprising the step of combining the individual bit streams, wherein the separation of the bits of the channel-coded bit stream into the individual bit streams, the bit rate matching applied to the individual bit streams, and the subsequent combination of the individual bit streams, are selected such that after further transmission of the data packet and the repeat data packet, quantities of bits transferred from the first bit stream, the second bit stream and the third bit stream are substantially the same.

11. The method for hybrid Automatic Repeat Request (ARQ) data transmission as claimed in claim 1, further comprising the step of combining the individual bit streams, wherein the separation of the bits of the channel-coded bit stream into the individual bit streams, the bit rate matching applied to the individual bit streams, and the subsequent combination of the individual bit streams, are selected such that after further transmission of the data packet and the repeat data packet, quantities of bits transferred from the first bit stream and the second bit stream are substantially the same.

12. The method for hybrid Automatic Repeat Request (ARQ) data transmission as claimed in claim 1, wherein bits of at least one of the bit streams are partially removed from the bit stream before application of the corresponding bit rate matching process to the bit stream.

13. The method for hybrid Automatic Repeat Request (ARQ) data transmission as claimed in claim 12, wherein the partially removed bits are deleted from the bit stream before application of the corresponding bit rate matching process to the bit stream.

14. The method for hybrid Automatic Repeat Request (ARQ) data transmission as claimed in claim 1, wherein the method is executed in a mobile system.

15. The method for hybrid Automatic Repeat Request (ARQ) data transmission as claimed in claim 1, wherein the repeat data packets comprise a number of 1 to N bit blocks, and wherein the step of separating the bits of the channel-coded bit stream into the individual bit streams performs a selection such that the number of bit blocks used for repeat data packets 1 to N increases with N.

16. The method for hybrid Automatic Repeat Request (ARQ) data transmission as claimed in claim 1, wherein the repeat data packets comprise a number of 1 to N bit blocks, and wherein the step of separating the bits of the channel-coded bit stream into the individual bit streams performs a selection such that only bits from bit stream 1 to N are used for a repeat data packet no. N.

17. An apparatus for hybrid Automatic Repeat Request (ARQ) data transmission, comprising:

a transmitter for transmitting a data packet and further transmitting a repeat data packet in response to an automatic repeat request, wherein the data packet and repeat data packet are at least partially identical;

a channel coder that receives transmitted data from the transmitter to form channel-coded bit streams from the data packet and repeat data packet;

a bit-selection device that performs a bit selection process to select bits for further transmission in at least one of the data packet and at the repeat data packet;

a bit-rate matching device the subjects bits for further transmission to a bit rate matching process, wherein the bit rate matching device:

separates bits from the channel-coded bit streams into at least a first bit stream and a second parallel bit stream, and determines if any bit streams are selected for exclusive further transmission in relation to the data packet and repeat data packet;

performs a separate bit rate matching process on each of the individual bit streams, wherein bits of the first bit stream are used unchanged for a data packet for further transmission, and bits of the second bit stream are used for padding the data packet for further transmission, if the first bit stream is selected for exclusive further transmission, and bits of the second bit stream are used unchanged for a repeat data packet and bits of the first bit stream are used for padding the repeat data packet, if the second bit stream is selected for exclusive further transmission.

18. An system for hybrid Automatic Repeat Request (ARQ) data transmission, comprising:

a transmitter for transmitting a data packet and further transmitting a repeat data packet in response to an automatic repeat request, wherein the data packet and repeat data packet are at least partially identical;

a channel coder that receives transmitted data from the transmitter to form channel-coded bit streams from the data packet and repeat data packet;

a bit-selection device that performs a bit selection process to select bits for further transmission in at least one of the data packet and at the repeat data packet;

a bit-rate matching device the subjects bits for further transmission to a bit rate matching process, wherein the bit rate matching device:

separates bits from the channel-coded bit streams into at least a first bit stream and a second parallel bit stream, and determines if any bit streams are selected for exclusive further transmission in relation to the data packet and repeat data packet;

performs a separate bit rate matching process on each of the individual bit streams, wherein bits of the first bit stream are used unchanged for a data packet for further transmission, and bits of the second bit stream are used for padding the data packet for further transmission, if the first bit stream is selected for exclusive further transmission, and bits of the second bit stream are used unchanged for a repeat data packet and bits of the first bit stream are used for padding the repeat data packet, if the second bit stream is selected for exclusive further transmission; and a receiver for receiving, decoding and evaluating one of the data packet and repeat data packet being further transmitted from the transmitter, wherein the receiver determines information content contained in one of the data packet and repeat data packet.

\* \* \* \* \*